United States Patent
Chu et al.

(10) Patent No.: US 11,165,767 B2
(45) Date of Patent: Nov. 2, 2021

(54) IDENTITY AUTHENTICATION METHOD AND SYSTEM, SERVER, AND TERMINAL

(71) Applicant: Huawei Technologies Co., Ltd., Shenzhen (CN)

(72) Inventors: ChengKang Chu, Singapore (SG); Jie Shi, Singapore (SG); Chengfang Fang, Singapore (SG); Xiwen Fang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/588,400

(22) Filed: Sep. 30, 2019

(65) Prior Publication Data

US 2020/0036704 A1   Jan. 30, 2020

Related U.S. Application Data

(63) Continuation of application No. PCT/CN2018/079283, filed on Mar. 16, 2018.

(30) Foreign Application Priority Data

Mar. 31, 2017   (CN) .......................... 201710211600.6

(51) Int. Cl.
*H04L 29/06*   (2006.01)
*H04L 9/00*   (2006.01)
(Continued)

(52) U.S. Cl.
CPC .......... *H04L 63/0823* (2013.01); *H04L 9/006* (2013.01); *H04L 9/3263* (2013.01);
(Continued)

(58) Field of Classification Search
CPC ............. H04L 63/0823; H04L 63/0876; H04L 9/3263; H04L 63/08; H04L 63/101;
(Continued)

(56) References Cited

U.S. PATENT DOCUMENTS 9,411,943 B2 *   8/2016   Maes ...................... G06F 21/10
2003/0126464 A1   7/2003   McDaniel et al.
(Continued)

FOREIGN PATENT DOCUMENTS

CN   1859246 A   11/2006
CN   101005699 A   7/2007
(Continued)

OTHER PUBLICATIONS

Kawulok, L.; Zielinski, K.; Jaeschke, M.; "Trusted Group Membership Service for JXME (JXTA4J2ME)", International Conference on Wireless and Mobile Computing, Networking and Communications, IEEE, Aug. 22-24, 2005, 6 pages.*
(Continued)

*Primary Examiner* — Victor Lesniewski
(74) *Attorney, Agent, or Firm* — Leydig, Voit & Mayer, Ltd.

(57) ABSTRACT

An identity authentication method is described. The method includes, when receiving a group joining request that is sent by a first terminal and that is used for joining a trusted group, generating, by a server, a first certificate for the first terminal based on a first version number, and sending them to the first terminal. The method further includes, when determining that a second terminal is removed from the trusted group, updating the first version number to a second version number; and separately generating, by the server based on the second version number, a corresponding second certificate for a terminal not removed from the trusted group; and separately sending the corresponding second certificate and the second version number to the terminal not removed from the trusted group. In this way, during authentication, a terminal may compare a version number of the other party to perform identity authentication, thereby improving authentication efficiency.

6 Claims, 8 Drawing Sheets

(51) Int. Cl.
*H04L 12/28* (2006.01)
*H04L 9/32* (2006.01)
*H04W 12/06* (2021.01)

(52) U.S. Cl.
CPC .......... *H04L 12/28* (2013.01); *H04L 63/0876* (2013.01); *H04L 63/101* (2013.01); *H04L 63/108* (2013.01); *H04W 12/06* (2013.01); *H04L 2209/80* (2013.01)

(58) Field of Classification Search
CPC ....... H04L 63/108; H04L 9/006; H04L 12/28; H04L 65/1033; H04L 29/06; H04W 12/06; H04W 12/0609
See application file for complete search history.

(56) References Cited

U.S. PATENT DOCUMENTS

| | | | |
|---|---|---|---|
| 2005/0071631 A1 | 3/2005 | Langer | |
| 2006/0155855 A1* | 7/2006 | Hamai | H04L 9/3268 709/227 |
| 2006/0177066 A1 | 8/2006 | Han et al. | |
| 2006/0251256 A1 | 11/2006 | Asokan et al. | |
| 2007/0245414 A1* | 10/2007 | Chan | H04L 9/3234 726/12 |
| 2008/0307508 A1 | 12/2008 | Conley et al. | |
| 2009/0187983 A1* | 7/2009 | Zerfos | H04L 63/0823 726/10 |
| 2010/0251348 A1* | 9/2010 | Verma | H04L 63/065 726/7 |
| 2011/0225409 A1 | 9/2011 | Sibert et al. | |
| 2011/0277027 A1 | 11/2011 | Hayton et al. | |
| 2013/0015236 A1 | 1/2013 | Porter et al. | |
| 2014/0082365 A1* | 3/2014 | Everhart | H04L 63/065 713/175 |
| 2014/0095866 A1* | 4/2014 | Grebennikov | H04L 9/3263 713/156 |
| 2016/0036819 A1* | 2/2016 | Zehavi | H04W 4/70 726/4 |
| 2016/0149890 A1* | 5/2016 | Ujiie | H04L 63/101 726/3 |
| 2016/0269374 A1* | 9/2016 | Smith | H04L 63/0435 |
| 2016/0277195 A1* | 9/2016 | Maeda | H04L 63/0823 |
| 2017/0078283 A1* | 3/2017 | Unagami | H04L 63/065 |
| 2017/0149792 A1* | 5/2017 | Smith | H04L 63/126 |
| 2017/0201382 A1* | 7/2017 | Lindteigen | H04L 9/3263 |
| 2017/0201385 A1* | 7/2017 | Kravitz | H04L 9/0825 |
| 2017/0279620 A1* | 9/2017 | Kravitz | H04L 9/3268 |
| 2017/0346848 A1* | 11/2017 | Smith | H04L 63/06 |
| 2018/0103039 A1* | 4/2018 | Thaler | H04L 41/0893 |

FOREIGN PATENT DOCUMENTS

| | | |
|---|---|---|
| CN | 101167305 A | 4/2008 |
| CN | 102404347 A | 4/2012 |
| CN | 102420690 A | 4/2012 |
| CN | 103533403 A | 1/2014 |
| CN | 104539423 A | 4/2015 |
| EP | 1688843 A1 | 8/2006 |
| EP | 1976220 A1 | 10/2008 |
| GB | 2520532 A | 5/2015 |
| WO | 2005034424 A1 | 4/2005 |
| WO | 2007027895 A2 | 3/2007 |
| WO | 2013150186 A1 | 10/2013 |

OTHER PUBLICATIONS

Asaeda, Hitoshi; Rahman, Musfiq; Manshaei, Mohammad Hossein; Fukuzawa, Yasuko; "Implementation of Group Member Authentication Protocol in Mobile Ad-hoc Networks", Wireless Communications and Networking Conference, IEEE, Apr. 3-6, 2006, pp. 2205-2210.*

"Public key infrastructure," https://baike.baidu.com/item/%E5%85%AC%E9%92%A5%E5%9F%BA%E7%A1%80%E8%AE%BE%E6%96%BD/10881894?fromtitle=PKI&fromid=212376, pp. 1-6, Baidu Baike, Retrieved Dec. 18, 2019.

"IOS Security guide. iOS 12.3 May 2019," http://images.apple.com/cn/business/docs/iOS_Security_Guide.pdf, pp. 1-94, Apple, Retrieved Dec. 2019.

CN/201710211600.6, Notice of Allowance/Search Report, dated Mar. 4, 2021.

* cited by examiner

IDENTITY AUTHENTICATION METHOD AND SYSTEM, SERVER, AND TERMINAL

CROSS-REFERENCE TO RELATED APPLICATIONS

This application is a continuation of International Application No. PCT/CN2018/079283, filed on Mar. 16, 2018, which claims priority to Chinese Patent Application No. 201710211600.6, filed on Mar. 31, 2017. The disclosures of the aforementioned applications are hereby incorporated by reference in their entireties.

TECHNICAL FIELD

This application relates to the authentication field, and in particular, to an identity authentication method and system, a server, and a terminal.

BACKGROUND

In a future Internet of Things scenario, all devices access the Internet in various manners, but the devices usually need to become a group and jointly cooperate with each other. For example, in a smart home, a refrigerator, a television, a washing machine, an air conditioner, a light, a smart lock, a gateway, a mobile phone, a tablet, and the like in the home all need to be capable of communicating with each other, and the devices can be simply controlled by an owner and autonomously communicate with each other. For example, once a smart door lock is opened, the lock sends an instruction to turn on a light and an air conditioner in a house. When clothes are washed, a washing machine alerts an owner on a television that the clothes may be dried. If such type of device-to-device communication has no proper security protection, the communication is extremely possible to become a target of a hacker attack.

Security protection of device-to-device communication includes two aspects: authentication and encryption. Authentication means that before communicating with each other, two devices need to first determine that the other party is a trustable target that one party needs to communicate with, instead of a device faked by a hacker. Encryption means that after communication starts, transmitted information is encrypted for protection to avoid eavesdropping by a hacker. Generally, after having been authenticated, a device may exchange a key by using a key exchange protocol and perform encryption. Therefore, device authentication is critical to security. Establishment of a trusted group first requires a trust center, and the trust center is responsible for issuing a public key certificate of each device, that is, an identity card of the device. The public key certificate includes a signature of the trust center for a public key of the device. The device owns a corresponding private key. The public key certificate is disclosed information. When the device needs to prove its identity, the device needs to provide the public key certificate and sign by using the corresponding private key, to prove that the device owns the private key corresponding to the certificate. Therefore, key management is most important for device authentication, and how to enable each device to correctly determine that a public key certificate of another device is still in a trusted group and not removed is an important subject.

Currently, in a most common Public Key Infrastructure (PKI) architecture on the Internet, a certificate authority (CA) is established as a trustable center. The CA issues a public key certificate of each device. Each time a device intends to be added to a group, the device applies for a public key certificate from the CA. When a group member needs to be removed, the CA places the device in a removing list. When two devices need to perform authentication, after receiving a public key certificate of the other party, an authentication party first asks for the removing list from the CA, and uses a public key of the CA to authenticate whether signatures of the certificate and the removing list are correct. If both signatures are correct and the certificate is not in the removing list, authentication succeeds, and a key may be exchanged based on the public key. In this way, the key is exchanged based on the public key of the other party each time. As a result, communication costs are high, there are a large quantity of rounds, and precomputation cannot be performed, so that authentication efficiency is relatively low.

SUMMARY

Embodiments of this application provide an identity authentication method and system, a server, and a terminal, to improve authentication efficiency.

According to a first aspect of the embodiments of this application, an identity authentication method is provided, including: when a first terminal is to join a trusted group, receiving, by a server, a group joining request of the first terminal, where the group joining request includes an identifier and a public key of the first terminal; storing, by the server, the identifier and the public key of the first terminal to a device list; generating a first certificate for the first terminal based on a first version number by using a private key of the server, where a condition parameter for generating the first certificate may further include the identifier and the public key of the first terminal and a name identifier of the trusted group; and sending, by the server, the first certificate and the first version number to the first terminal, where the device list stores identifiers and public keys of all terminals in the trusted group.

When determining that a second terminal is removed from the trusted group, the server deletes an identifier and a public key of the second terminal from the device list, and the server updates the first version number to a second version number according to a preset rule. For example, the version number may be a numeric value and the preset rule may be an accumulation rule. If the first version number is a numeric value 10, the second version number obtained through accumulation once is a numeric value 11. The server separately generates, based on the second version number, a corresponding second certificate for a terminal not removed from the trusted group. A condition parameter for generating the second certificate may further include an identifier and a public key of the corresponding terminal and the name identifier of the trusted group. After generating the second certificate, the server separately sends the corresponding second certificate and the second version number to the terminal not removed from the trusted group. The first terminal and the second terminal may be a same terminal or may be different terminals.

In this way, each time a terminal is removed from the trusted group, the server updates a version number, generates a new certificate, and sends an updated version number and the generated new certificate to a terminal not removed, so that terminals not removed have the same version number, and a version number of a terminal already removed is the old version number that is different from that of the terminal not removed. In this way, during authentication, a terminal may compare a version number of the other party to perform identity authentication, thereby improving authentication efficiency.

In a possible implementation, the server may further send the device list to the first terminal, so that the first terminal stores the device list. The device list includes identifiers and public keys of all terminals not removed from the trusted group. In this way, in an authentication process, the first terminal may obtain a public key of a to-be-authenticated terminal from the device list to perform authentication processing. For example, when the first terminal performs authentication on the second terminal, and the first terminal determines that a version number of the second terminal is the same as that stored by the first terminal, the first terminal may perform encryption processing on a data packet by using the public key of the second terminal in the device list, to perform communication authentication with the second terminal. Alternatively, the first terminal may directly search the device list for the public key of the second terminal, and may directly encrypt a data packet by using the public key of the second terminal, to perform communication authentication.

In another possible implementation, the server may further send, to all the terminals not removed from the trusted group, the device list storing the identifier and the public key of the newly added first terminal, so that the terminal may similarly obtain a public key of a to-be-authenticated terminal from the device list in an authentication process, to perform authentication processing.

According to a second aspect of the embodiments of this application, an identity authentication method is provided, including: when a first terminal is to join a trusted group, sending, by the first terminal to a server, a group joining request for requesting to join the trusted group, where the group joining request includes an identifier and a public key of the first terminal; and receiving, by the first terminal, a first certificate and a first version number that are sent by the server, where the first certificate is a certificate generated by the server for the first terminal based on the first version number; and when a second terminal is removed from the trusted group, receiving, by the first terminal, a second certificate and a second version number that are sent by the server, where the second version number is a version number updated by the server according to a preset rule, and the second certificate is a certificate generated by the server for the first terminal based on the second version number.

In a possible implementation, the method further includes: receiving, by the first terminal, a device list sent by the server, where the device list includes identifiers and public keys of all terminals not removed from the trusted group, so that the first terminal obtains, from the device list in an authentication process, a public key of a to-be-authenticated terminal to perform authentication processing.

According to a third aspect of the embodiments of this application, an identity authentication method is provided, including: receiving, by a first terminal, an authentication request sent by a second terminal, where the authentication request includes a first version number and an identifier of the second terminal, the first version number is a version number sent by a server to the first terminal, and when a terminal is removed from a trusted group, the server accumulates a version number and sends an accumulated version number to all terminals not removed from the trusted group; determining, by the first terminal, whether the first version number is less than a second version number, where the second version number is a version number sent by the server and stored by the first terminal; and when the first terminal determines that the first version number is less than the second version number, determining, by the first terminal, that an identity of the second terminal becomes invalid.

In this way, in an authentication process, the first terminal needs to obtain only the identifier and a version number of the second terminal, and may compare the version number of the second terminal with that stored by the first terminal, to determine whether the version number of the second terminal is an old version number. If the version number of the second terminal is the old version number, the second terminal is already removed by the server, and it is determined that the identity of the second terminal becomes invalid. In this way, offline authentication is implemented, and authentication information is simple, less signaling is exchanged, and authentication efficiency is improved in an authentication process.

In a possible implementation, the first terminal stores a device list sent by the server, the device list includes recorded information of all the terminals not removed from the trusted group, and the recorded information may include an identifier and a public key of a terminal not removed from the trusted group, and a correspondence between each identifier and a public key; when determining that the first version number is less than or equal to the second version number, the first terminal determines whether the device list includes recorded information of the second terminal; the first terminal may match the received identifier sent by the second terminal with the recorded information in the device list; and if there is a same matched result, it indicates that the device list includes the recorded information of the second terminal, or if there is no same matched result, it indicates that the device list does not include the recorded information of the second terminal; and when determining that the device list does not include the recorded information of the second terminal, the first terminal determines that the identity of the second terminal becomes invalid.

In an actual application, because of network coverage, after the server updates a version number and a certificate, some terminals cannot update the version number and the certificate in time. Therefore, the version number is actually the old version number. However, if the first terminal stores the device list sent by the server, and the version number of the first terminal is the updated version number, the first terminal may determine, based on terminals in the device list, whether the second terminal is already removed. If the device list still includes the identifier and a public key of the second terminal, it is identified that the second terminal is not removed by the server. If the device list already does not include the identifier or a public key of the second terminal, it is identified that the second terminal is already removed, and it is determined that the identity of the second terminal becomes invalid. In this way, a terminal that cannot update a version number or a certificate in time and that is not removed can also be authenticated, and authentication accuracy is improved.

In another possible implementation, the first terminal stores a device list sent by the server, and the device list includes identifiers and public keys of all the terminals not removed from the trusted group; when determining that the first version number is greater than the second version number, the first terminal receives a second certificate sent by the second terminal; the first terminal checks, based on a public key of the server, whether the second certificate is a certificate sent by the server to the second terminal; and when determining that the second certificate is not the certificate sent by the server to the second terminal, the first terminal determines that the identity of the second terminal becomes invalid.

If the version number of the second terminal is greater than that of the first terminal, there are two possibilities. A first possibility is that the second terminal updates the version number and the certificate, but the first terminal does not update the version number or the certificate; and a second possibility is that the second terminal maliciously changes the version number to a relatively large version number, so as to be successfully authenticated by the first terminal. In this case, the first terminal cannot determine which case is true. Therefore, the first terminal requires the second terminal to send a certificate to the first terminal, and the first terminal checks, by using the public key of the server, whether the certificate is generated by the server. If yes, it indicates that the first possibility is true. If no, it indicates that the second possibility is true, and in this case, it is determined that the identity of the second terminal becomes invalid. In this way, both the case in which the first terminal does not update the version number or the certificate in time and the case in which a to-be-authenticated terminal maliciously changes a version number can be accurately determined, and authentication can be performed, to improve authentication accuracy.

According to a fourth aspect of the embodiments of this application, an identity authentication method is provided. The method includes: receiving, by a first terminal, an authentication request sent by a second terminal, where the authentication request includes a first version number and an identifier of the second terminal, the first version number is a version number sent by a server to the first terminal, and when a terminal is removed from a trusted group, the server accumulates a version number and sends an accumulatively subtracted version number to all terminals not removed from the trusted group; determining, by the first terminal, whether the first version number is greater than a second version number, where the second version number is a version number sent by the server and stored by the first terminal; and when the first terminal determines that the first version number is greater than the second version number, determining, by the first terminal, that an identity of the second terminal becomes invalid.

In a possible implementation, the first terminal stores a device list sent by the server, the device list includes recorded information of all the terminals not removed from the trusted group, and the recorded information includes an identifier and a public key of a terminal not removed from the trusted group, and a correspondence between each identifier and a public key; and when the first terminal determines that the first version number is greater than or equal to the second version number, the method further includes: determining, by the first terminal, whether the device list includes recorded information of the second terminal, where the first terminal may match the received identifier sent by the second terminal with the recorded information in the device list, and if there is a same matched result, it indicates that the device list includes the recorded information of the second terminal, or if there is no same matched result, it indicates that the device list does not include the recorded information of the second terminal; and when determining that the device list does not include the recorded information of the second terminal, determining, by the first terminal, that the identity of the second terminal becomes invalid.

In another possible implementation, the first terminal stores a device list sent by the server, and the device list includes identifiers and public keys of all the terminals not removed from the trusted group; and when the first terminal determines that the first version number is less than the second version number, the method further includes: receiving, by the first terminal, the second certificate sent by the second terminal; checking, by the first terminal based on a public key of the server, whether the second certificate is a certificate sent by the server to the second terminal; and when determining that the second certificate is not the certificate sent by the server to the second terminal, determining, by the first terminal, that the identity of the second terminal becomes invalid.

According to a fifth aspect of the embodiments of this application, a server is provided. The server includes: a generation unit, configured to: when a group joining request that is sent by a first terminal and that is used for joining a trusted group is received, generate a first certificate for the first terminal based on a first version number; a sending unit, configured to send the first certificate and the first version number to the first terminal; and an updating unit, configured to: when it is determined that a second terminal is removed from the trusted group, update, by the server, the first version number to a second version number according to a preset rule, where the generation unit is further configured to separately generate, based on the second version number, a corresponding second certificate for a terminal not removed from the trusted group; and the sending unit is further configured to separately send the corresponding second certificate and the second version number to the terminal not removed from the trusted group.

According to a sixth aspect of the embodiments of this application, a terminal is provided. When the terminal is a first terminal, the terminal includes: a sending unit, configured to send a group joining request for joining a trusted group to a server, where the group joining request includes an identifier and a public key of the first terminal; and a receiving unit, configured to receive a first certificate and a first version number that are sent by the server, where the first certificate is a certificate generated by the server for the first terminal based on the first version number, where the receiving unit is further configured to: when a second terminal is removed from the trusted group, receive a second certificate and a second version number that are sent by the server, where the second version number is a version number updated by the server according to a preset rule, and the second certificate is a certificate generated by the server for the first terminal based on the second version number.

According to a seventh aspect of the embodiments of this application, a terminal is provided. When the terminal is a first terminal, the terminal includes: a receiving unit, configured to receive an authentication request sent by a second terminal, where the authentication request includes a first version number and an identifier of the second terminal, the first version number is a version number sent by a server to the first terminal, and when a terminal is removed from a trusted group, the server accumulates a version number and sends an accumulated version number to all terminals not removed from the trusted group; a judging unit, configured to determine whether the first version number is less than a second version number, where the second version number is a version number sent by the server and stored by the first terminal; and a determining unit, configured to: when determining that the first version number is less than the second version number, determine, by the first terminal, that an identity of the second terminal becomes invalid.

According to an eighth aspect of the embodiments of this application, a terminal is provided. When the terminal is a first terminal, the terminal implements following steps: receiving, by the first terminal, an authentication request sent by a second terminal, where the authentication request includes a first version number and an identifier of the second terminal, the first version number is a version number sent by a server to the first terminal, and when a terminal is removed from a trusted group, the server accumulates a version number and sends an accumulatively subtracted version number to all terminals not removed from the trusted group; determining, by the first terminal, whether the first version number is greater than a second version number, where the second version number is a version number sent by the server and stored by the first terminal; and when the first terminal determines that the first version number is greater than the second version number, determining, by the first terminal, that an identity of the second terminal becomes invalid.

According to a ninth aspect of the embodiments of this application, an identity authentication system is provided. The system includes: a server, a first terminal, and a second terminal, where the first terminal is configured to send, to a server, a group joining request for requesting to join a trusted group; the server is configured to generate a first certificate for the first terminal based on a first version number; the server is further configured to send the first certificate and the first version number to the first terminal; the first terminal is further configured to receive the first certificate and the first version number that are sent by the server; when determining that a second terminal is removed from the trusted group, the server is further configured to update the first version number to a second version number according to a preset rule; the server is further configured to separately generate, based on the second version number, a corresponding second certificate for a terminal not removed from the trusted group; the server is further configured to separately send the corresponding second certificate and the second version number to the terminal not removed from the trusted group; and the first terminal is further configured to receive the second certificate and the second version number that are sent by the server.

According to a tenth aspect of the embodiments of this application, a server is provided, including: a processor, a memory, and a transceiver. The processor, the memory, and the transceiver are connected by using a bus, the memory stores a computer instruction, and the processor executes the computer instruction to perform the identity authentication method provided in the first aspect.

According to an eleventh aspect of the embodiments of this application, a terminal is provided, including: a processor, a memory, and a transceiver. The processor, the memory, and the transceiver are connected by using a bus, the memory stores a computer instruction, and the processor executes the computer instruction to perform the identity authentication method provided in the second aspect to the fourth aspect.

According to a twelfth aspect of the embodiments of this application, a storage medium is provided. The storage medium stores a computer instruction used to perform the identity authentication method in the first aspect to the fourth aspect.

According to a thirteenth aspect of the embodiments of this application, a computer program product is provided. The computer program product includes a computer software instruction, and the computer software instruction may be loaded by a processor to perform a procedure of the identity authentication method in any implementation of the first aspect to the fourth aspect.

As can be learned from the foregoing technical solutions, the embodiments of this application have the following advantages:

When receiving a group joining request that is of a first terminal and that is used for joining a trusted group, the server generates a first certificate for the first terminal based on a first version number, and sends the first certificate and the first version number to the first terminal; and when determining that a second terminal is removed from the trusted group, the server updates the first version number to a second version number according to a preset rule, separately generates, based on the second version number, a corresponding second certificate for a terminal not removed from the trusted group, and separately sends the corresponding second certificate and the second version number to the terminal not removed from the trusted group. In this way, during authentication, a terminal may compare a version number of the other party to perform identity authentication, thereby improving authentication efficiency.

DESCRIPTION OF EMBODIMENTS

The embodiments of this application provide an identity authentication method and system, a server, and a terminal, to improve authentication efficiency.

Figure 1:
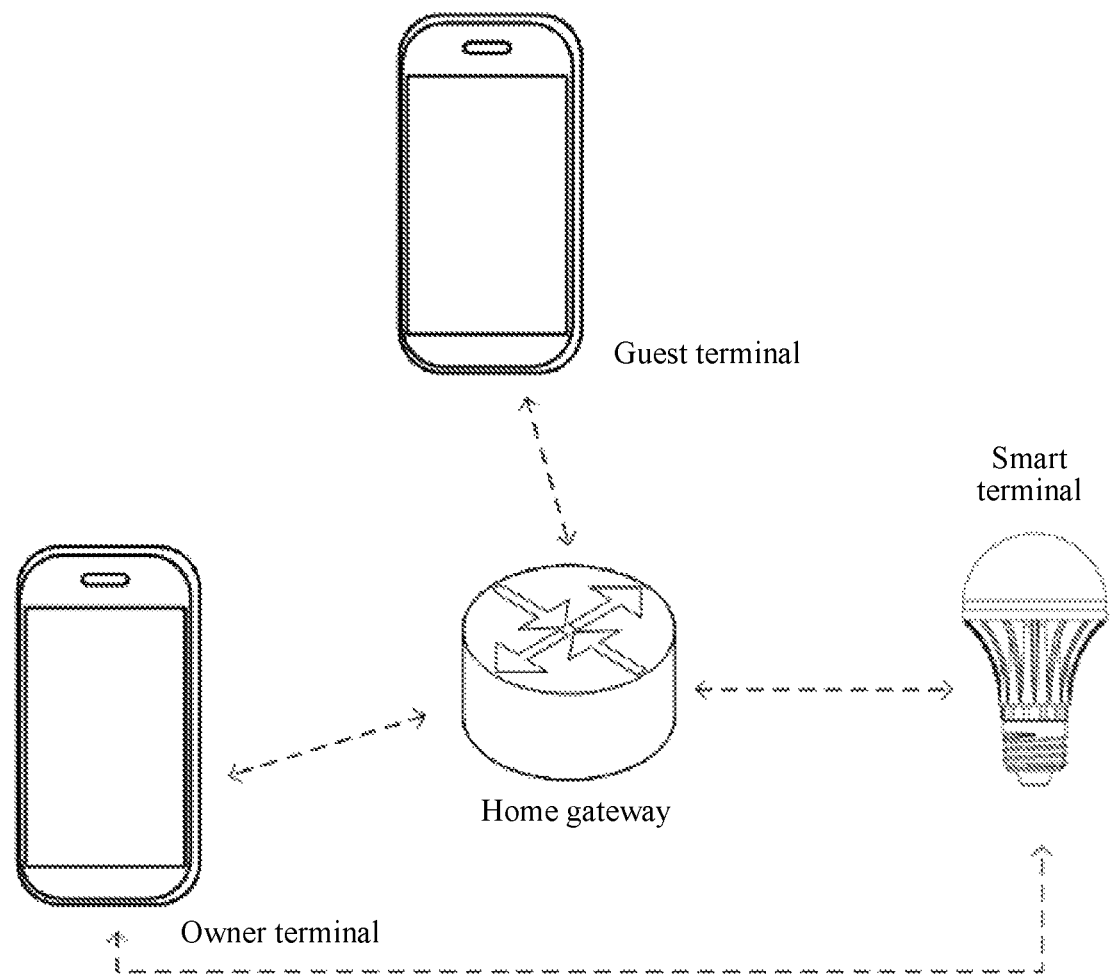
FIG. 1 is a schematic diagram of a system architecture to which an identity authentication method is applied according to an embodiment of this application.

FIG. 1 is a schematic diagram of a system architecture to which an identity authentication method is applied according to an embodiment of this application.

The architecture includes an owner terminal, a guest terminal, a smart terminal, and a home gateway, where the home gateway is separately connected to the owner terminal, the guest terminal, and the smart terminal in a wired or wireless manner. The home gateway is configured to perform a service function, that is, the home gateway is a server. The owner terminal has more function permissions than another terminal, for example, notifies the home gateway of allowing a terminal to join a trusted group, or sends an instruction to the home gateway to remove a terminal from a trusted group. The home gateway establishes the trusted group, and the home gateway serves as a trust center of the trusted group and is responsible for issuing a public key certificate of each terminal device, in other words, an identity card of the terminal device. The public key certificate includes a signature of the trust center for a public key of the terminal device, and the terminal device has a corresponding private key. The public key certificate is disclosed information. When the terminal device needs to prove its identity, the terminal device needs to provide the public key certificate and sign by using the corresponding private key, to prove that the terminal device owns the private key corresponding to the certificate.

In an embodiment of this application, a counter-based authentication and key management mechanism of a trusted group is provided, and a simple and efficient counter can be used to more effectively perform authentication and manage a group key. Specifically, the home gateway maintains a device list and a version number of a trusted group, where the device list stores identifiers and public keys of all terminals in the trusted group, and a correspondence between an identifier and a public key of a terminal. When a new terminal needs to join the trusted group, the home gateway needs to obtain an identifier and a public key of the new terminal, adds the identifier and the public key of the terminal to the device list, and stores a correspondence between the identifier and the public key of the new terminal. In addition, the home gateway needs to send the currently maintained version number to the added new terminal, so that version numbers received by all terminals in the trusted group are currently the same. When a terminal needs to be removed from the trusted group, the home gateway deletes an identifier and a public key of the terminal from the device list, updates the version number, for example, performs accumulation once, and sends an updated version number to all other terminal devices not removed from the trusted group. In this way, terminal devices not removed store the same version number, and a version number of a terminal device removed is different from that of the terminal device not removed, for example, is less than that of the terminal device not removed. Therefore, in a subsequent authentication process of terminal devices, the terminal device only needs to send the version number to perform simple authentication, thereby improving authentication efficiency.

In addition, to perform authentication more cautiously, each time after updating the device list, the home gateway may further send an updated device list to all terminal devices not removed, and the terminal devices store the device list. In this way, when the terminal devices perform authentication on each other, although a version number sent by the other party is different from that stored by one party, it may be further determined whether the stored device list includes recorded information of the other party, for example, an identifier of the terminal device, to determine whether an identity of the other party is valid. This avoids a case in which some terminal devices, for example, cannot update the version number in time because of being offline and consequently it is considered that identities of the terminal devices become invalid, and offline authentication is implemented. In addition, when the terminal device stores the device list, after the terminal device determines whether the version number of the other party is correct, if the device list includes the identifier and a public key of the other party, the terminal device may further perform precomputation without the public key sent by the other party, to improve authentication efficiency.

It should be noted that in the foregoing embodiment described above, an example in which the home gateway is the server is used for description. In this embodiment of this application, the server may alternatively be a serving device having a smart processing capability, such as a router, a switch, or a cloud server. This is not specifically limited in this application. The owner terminal may be a terminal device having a smart processing capability, such as a smartphone, a notebook computer, a personal computer, or a smartwatch. The smart terminal may be a device having a smart control capability, such as a smart light bulb, a smart refrigerator, or a smart air conditioner. This is not specifically limited.

Figure 2:
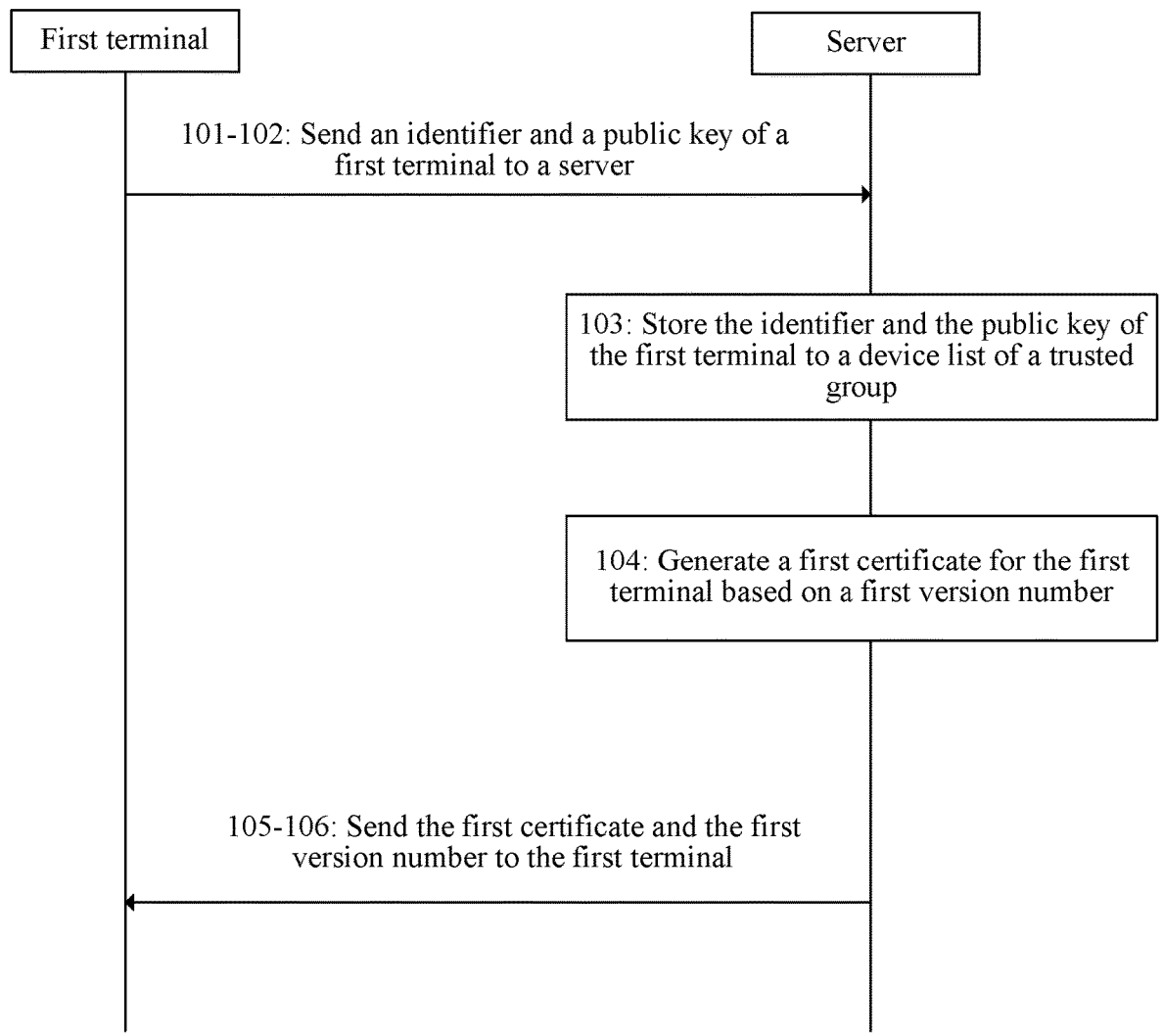
FIG. 2 is a schematic diagram of an embodiment of an identity authentication method according to an embodiment of this application.

An identity authentication method provided in this application is described in detail below by using a specific embodiment. Referring to FIG. 2, an embodiment of FIG. 2 describes a specific implementation in which when a terminal joins a trusted group, a server and the terminal maintain a device list and update a version number.

As shown in FIG. 2, an embodiment of an identity authentication method according to an embodiment of this application includes the following steps:

101: When a first terminal is to join a trusted group, the first terminal sends an identifier and a public key of the first terminal to a server.

102: The server receives the identifier and the public key that are sent by the first terminal.

When the first terminal needs to join the trusted group, the first terminal generates a public-private key pair, for example, generates a public-private key pair (Pkx, Skx) by using a generation algorithm, namely, an elliptic curve digital signature algorithm (ECDSA), agreed on with the server. After generating the public-private key pair, the first terminal sends a group joining request to the server. The request includes the public key of the first terminal and the identifier of the first terminal. To be specific, the first terminal sends a generated public key Pk and the identifier of the first terminal, for example, IDx of the first terminal, to the server. Optionally, to improve security of sending the public key and the identifier, the first terminal may send the group joining request through a security channel.

103: The server stores the received identifier and public key of the first terminal to a device list of the trusted group.

The server maintains a device list that includes public keys and identifiers of all terminal devices in the trusted group, and a correspondence between each public key and an identifier. When a new terminal needs to join the trusted group, the server adds a public key and an identifier of the terminal and a correspondence to the device list, and it indicates that the new terminal already joins the trusted group.

Optionally, if the server maintains a plurality of trusted groups, for example, the plurality of trusted groups may include a living room group, a bedroom group, and a kitchen group, the server may add the identifier and the public key of the first terminal to a device list of a selected trusted group based on a group name indicated by the group joining request sent by the first terminal, or the server smartly allocates a trusted group to the first terminal, and adds the identifier and the public key of the first terminal to a device list of the allocated trusted group.

104: The server generates a first certificate for the first terminal based on a current first version number.

In this application, the server further maintains a version number, and the version number may be, for example, indicated by a counter. A current version number indicates a value of the counter currently maintained by the server. Because the version number is updated, a terminal device in each trusted group should receive a latest version number that is sent by the server and that is currently maintained by the server, so that when terminal devices perform authentication on each other, a terminal device may compare a version number of the other party and that stored by the terminal device, to determine whether an identity of the other party is valid. However, because the version number is only a simple value, the version number is very easily maliciously modified. If authentication is performed only by using the version number, incorrect successful authentication may be caused. Therefore, the server needs to generate a certificate for a terminal by using the current version number, so that during authentication, the terminal checks again whether a version number in a certificate of the other party is correct, or determines, by using the version number, whether a certificate of the other party is valid.

Specifically, the server first generates a public-private key pair (Pkgw, Skgw), generates a signature certificate T by using a private key Skgw, and uses the signature T as the first certificate of the first terminal. Optionally, when the server generates the signature certificate, a name identifier G-ID of the trusted group of the first terminal, the public key Pkx of the first terminal, and the identifier IDx of the first terminal may be further included. In this case, the signature certificate T may be indicated as T=sign (G-ID∥(IDx, Pkx)∥counter).

105: The server sends the first certificate and the first version number to the first terminal.

106: The first terminal receives the first certificate and the first version number that are sent by the server.

After the first terminal receives the first certificate and the first version number that are sent by the server, it indicates that the first terminal knows that the first terminal already successfully joins the trusted group. The first terminal may perform identity authentication with another terminal device in the trusted group by using the received first certificate and first version number, to perform an operation such as instruction control. For example, the first terminal is a guest terminal. When the guest terminal successfully joins the trusted group, an authentication request may be sent to a smart light bulb. After the smart light bulb determines, based on a version number and a certificate, that an identity of the guest terminal is valid, the guest terminal may send a control instruction to the smart light bulb, for example, a control instruction of switching on a light, switching off a light, adjusting brightness, or the like. Optionally, if the server maintains a plurality of trusted groups and the server allocates a group to the first terminal, the server may further send a name identifier G-ID of the allocated group to the first terminal, so that during subsequent authentication between terminal devices, a terminal device determines whether the other party and the terminal device are in a same trusted group.

Figure 3:
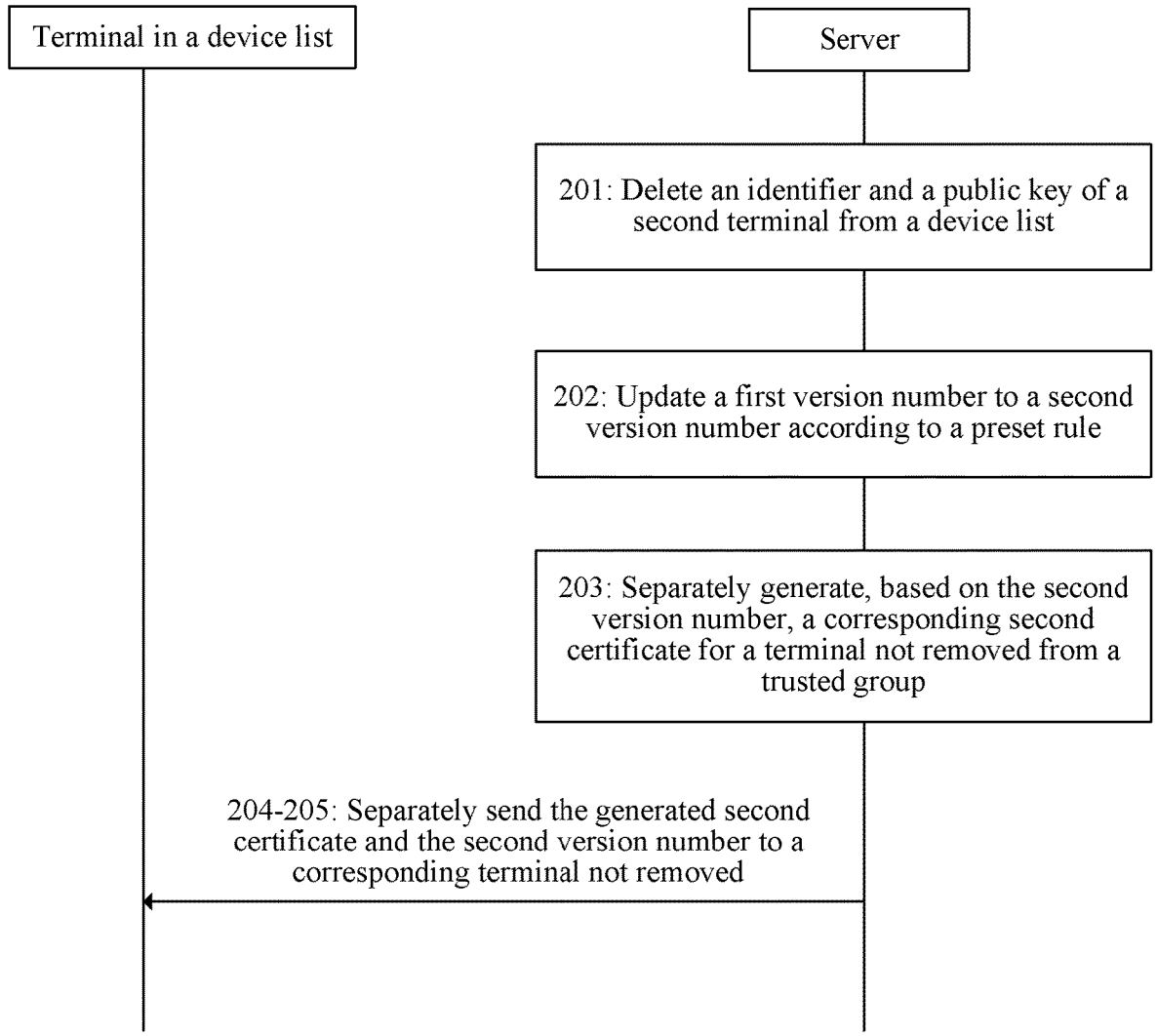
FIG. 3 is a schematic diagram of another embodiment of an identity authentication method according to an embodiment of this application.

Referring to FIG. 3, an embodiment of FIG. 3 describes a specific implementation in which when a terminal is removed from a trusted group, a server and the terminal maintain a device list and update a version number.

201: When a second terminal is removed from the trusted group, the server deletes an identifier and a public key of the second terminal from the device list.

There may be a plurality of conditions of removing a terminal. For example, an owner terminal sends, to the server, an instruction that the second terminal needs to be removed from the trusted group, or when detecting that the second terminal has a virus source, the server may actively perform removing. When the second terminal needs to be removed, the public key and the identifier of the second terminal first need to be deleted from the device list.

202: The server updates the first version number to a second version number according to a preset rule.

The server needs to update the first version number to the second version number, so that the terminal removed and another terminal in the trusted group cannot successfully perform identity authentication. For example, a value of a counter is accumulated once, to obtain a new value of the counter. After the new version number is sent to another terminal not removed, although the second terminal removed and another terminal perform authentication, version numbers are different and consequently authentication does not succeed.

203: The server separately generates, based on the updated second version number, a corresponding second certificate for another terminal not removed from the trusted group.

To avoid incorrect successful authentication caused by malicious modification of the version number, the server further needs to generate, based on the updated version number, a new certificate, that is, the second certificate, for each terminal not removed. In this way, although a terminal removed maliciously modifies the version number, the terminal cannot receive the latest certificate generated by the server. Therefore, during comparison of certificates, authentication does not succeed.

204: The server separately sends the generated second certificate and the second version number to a corresponding terminal not removed, so that the terminal not removed updates the certificate and the version number.

205: The terminal in the device list receives the second certificate and the second version number that are sent by the server.

After receiving the second certificate and the second version number that are sent by the server, the terminal in the device list updates the previously stored certificate and version number, and stores the latest certificate and version number, to help perform authentication determining when authentication between terminal devices is subsequently performed. Optionally, to improve security of sending the public key and the identifier, the server may alternatively send the second certificate and the second version number through a security channel.

In an actual application, there may be a place in which network coverage is incomplete, for example, a location such as a gate lock or a balcony light bulb may have a relatively weak network signal. As a result, the server fails to send the second certificate and the second version number to the gate lock and the balcony light bulb, and consequently, the gate lock and the balcony light bulb cannot obtain the latest certificate and version number in time through update. In this embodiment of this application, when detecting that sending of the second certificate and the second version number fails, the server may send indication information to a particular terminal device, for example, an owner terminal, to instruct the owner terminal to perform relay update. The indication information includes the second certificate and the second version number of the gate lock and the balcony light bulb. After receiving the indication information, the owner terminal prompts a user to perform relay update with the owner terminal, for example, prompts the user to move to areas of the gate lock and the balcony light bulb with the owner terminal. The second certificate and the second version number of the gate lock that are generated by the server are sent to a gate lock device by using the owner terminal, and the second certificate and the second version number of the balcony light bulb that are generated by the server are sent to the balcony light bulb by using the owner terminal. In this way, during each update, all terminal devices in the trusted group can obtain the latest version number and certificate through update, to improve authentication reliability.

Figure 4:
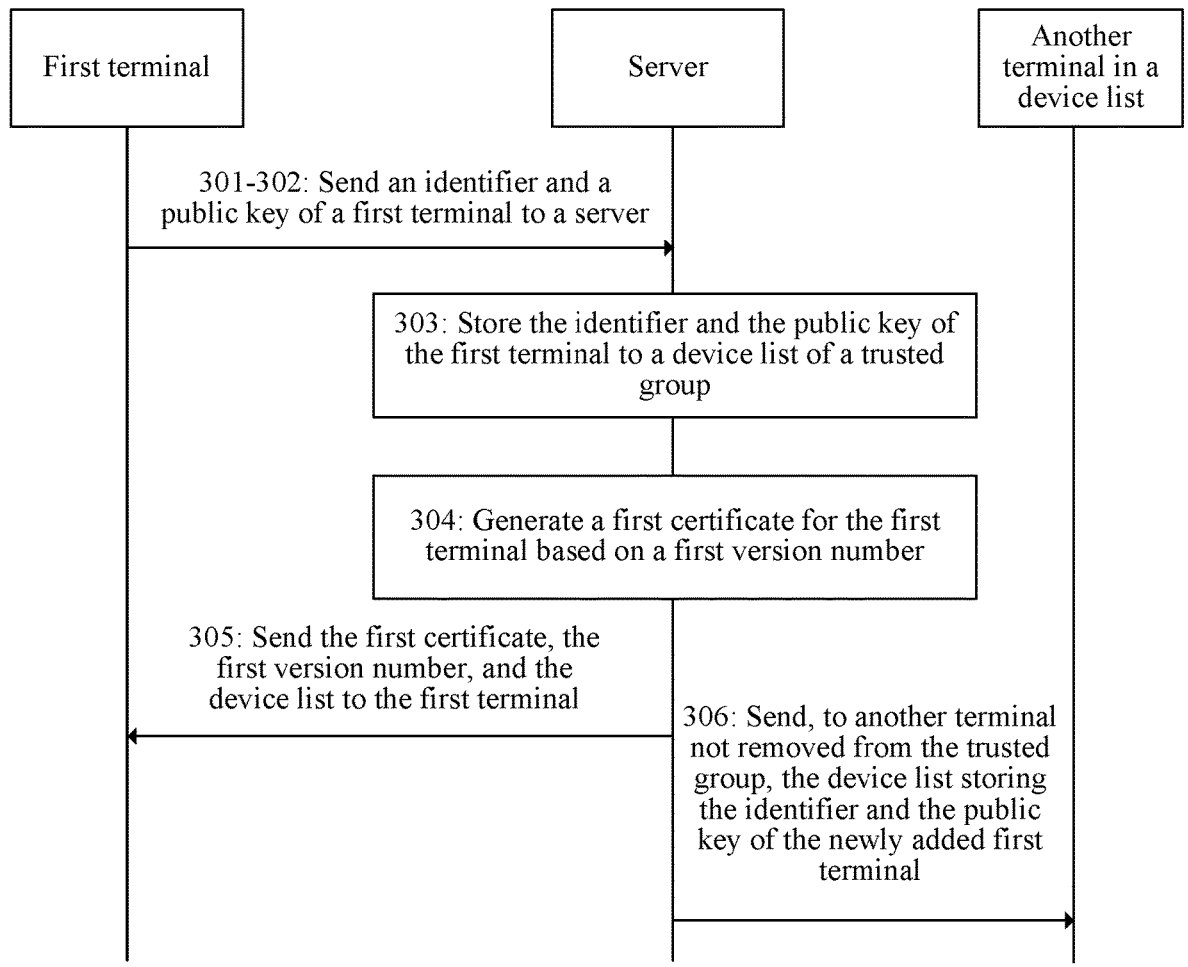
FIG. 4 is a schematic diagram of another embodiment of an identity authentication method according to an embodiment of this application.

The embodiment of FIG. 2 describes a process of an embodiment in which the server updates and maintains the device list when a new terminal joins the trusted group. In a possible implementation, alternatively, each terminal device may separately store the device list. After updating information of the device list, the server may further send the updated device list to each terminal device, to help the terminal device obtain a public key of the other party from the device list to perform precomputation in an authentication process, to improve authentication efficiency. Referring to FIG. 4, an embodiment of FIG. 4 is a specific implementation in which a server further sends an updated device list to all terminals in the list when a new terminal joins a trusted group.

For steps 301 to 303, refer to steps 101 to 103 in the embodiment of FIG. 2, and details are not described herein.

304: The server generates a first certificate for the first terminal based on a current first version number.

In the embodiment of FIG. 2, the server may generate the signature certificate for the first terminal based on an identifier and a public key of the first terminal, the first version number, and a group name identifier. In this embodiment, because an identifier of each terminal in the trusted group needs to be separately stored in a device list, to improve certificate reliability, the server may further generate the first certificate for the first terminal based on the group name identifier, the first version number, and information about the device list. The first certificate may be specifically indicated as T=sign(G-ID||({ID,Pk})||counter).

305: The server sends the first certificate, the first version number, and the device list to the first terminal, where the device list includes identifiers and public keys of all terminals not removed from the trusted group, so that the first terminal obtains, from the device list in an authentication process, an identifier and a public key of a to-be-authenticated terminal to perform authentication precomputation.

In this embodiment of this application, the server not only sends the first certificate and the first version number to the first terminal, but also sends the latest device list to the first terminal. In this way, in an authentication process, when determining that a version number of the other party is the same as the version number stored by the first terminal, the first terminal may perform precomputation by using public key information of the other party in the device list stored by the first terminal. For example, in a subsequent communication authentication process, the other party does not need to send a public key, and the first terminal may perform encrypted computation based on the public key of the other party that is stored by the first terminal, to improve authentication efficiency.

306: The server sends, to all other terminals not removed from the trusted group, the device list storing the identifier and the public key of the newly added first terminal.

Because the identifier and the public key of the new terminal are newly added to the trusted group, after updating the device list, the server may further send the updated device list to all other terminals not removed from the trusted group, so that the device list stored by the other terminals stores latest information.

It should be noted that in the embodiment of FIG. 4, an implementation in which a terminal is removed from the trusted group corresponds to an implementation in which a new terminal is added to the trusted group, and is similar to the removing process in the embodiment of FIG. 3. A difference lies in that when the server generates the second certificate, the second certificate may be T=sign(G-ID||({ID, Pk})||counter), where {ID, Pk} is the device list from which the identifier and the public key of the terminal removed are deleted. In addition, the server sends the newly generated second certificate and second version number to terminals not removed from the trusted group, and the server further needs to send the updated device list to the terminals.

The foregoing embodiment describes an implementation of a process of how to add a new terminal to the trusted group and how to remove a terminal from the trusted group, and the following describes a specific manner of authentication between terminal devices.

Figure 5:
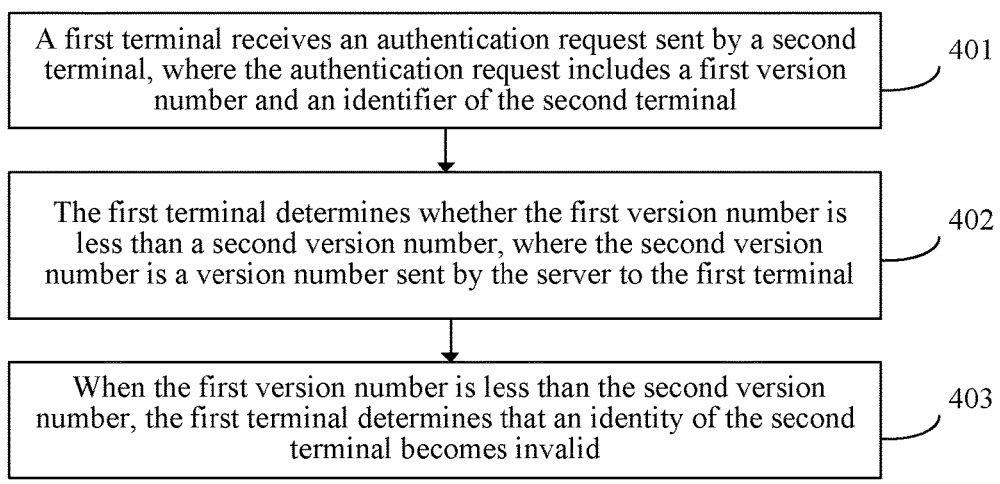
FIG. 5 is a schematic diagram of another embodiment of an identity authentication method according to an embodiment of this application.

As shown in FIG. 5, another embodiment of an identity authentication method according to an embodiment of this application includes the following steps.

401: A first terminal receives an authentication request sent by a second terminal, where the authentication request includes a first version number and an identifier of the second terminal, the first version number is a version number sent by a server to the first terminal, and when a terminal is removed from a trusted group, the server accumulates a version number and sends an accumulated version number to all terminals not removed from the trusted group.

Optionally, the authentication request may further include a certificate of the second terminal, that is, a certificate sent by the server to the second terminal. In this way, both the first version number and the certificate of the second terminal are sent to the first terminal, to improve reliability of a version number of the second terminal.

402: The first terminal determines whether the first version number is less than a second version number, where the second version number is a version number sent by the server and stored by the first terminal.

Because the server updates the version number through accumulation each time, if the first version number is less than the second version number, it indicates that the version number stored by the first terminal is a new version number, and the version number stored by the second terminal is an old version number. If the first version number is greater than the second version number, it indicates that the version number stored by the second terminal is a new version number, and the version number stored by the first terminal is an old version number.

403: When the first version number is less than the second version number, the first terminal determines that an identity of the second terminal becomes invalid.

When the first version number is less than the second version number, it indicates that the second terminal does not obtain the new version number through update. The server updates a version number once only each time a terminal is removed. Therefore, the second terminal may be a terminal removed. Therefore, the first terminal may determine that the identity of the second terminal becomes invalid, and a subsequent certificate authentication process does not need to be performed. In this way, the first terminal may compare the version number of the other party with the version number stored by the first terminal, to determine whether the identity of the other party is valid, and the identity of the other party does not need to be determined in the removing list as in the prior art, to reduce a communication procedure and an information volume, and improve authentication efficiency.

Optionally, when the first version number is greater than or equal to the second version number, the first terminal may perform subsequent communication authentication, including: the second terminal is required to send a public key and the certificate of the second terminal, and the first terminal first checks, by using a public key of the server, whether the certificate is sent by the server to the second terminal; if no, authentication fails; if yes, the first terminal then performs encrypted computation by using the public key and a private key of the first terminal and sends an encrypted data packet to the second terminal for communication authentication, and if the second terminal can parse out the encrypted data packet, authentication succeeds.

In this way, the authentication manner provided in this application reduces communication exchange and improves authentication efficiency. In addition, the server does not need to participate in the authentication process and offline authentication is implemented.

Figure 6:
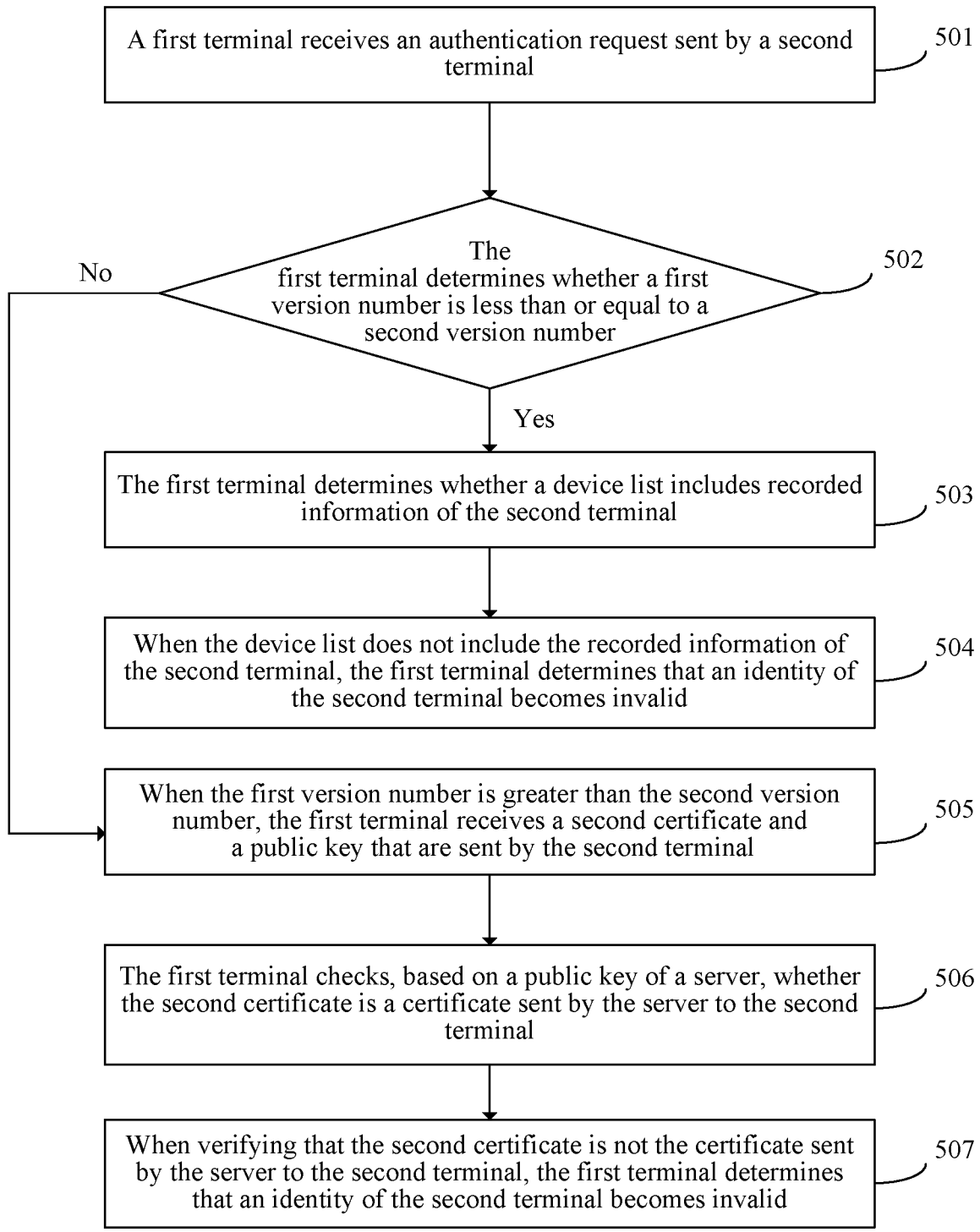
FIG. 6 is a schematic diagram of another embodiment of an identity authentication method according to an embodiment of this application.

In another implementation, each terminal device stores the device list sent by the server, and the device list includes identifiers and public keys of all terminals not removed. As shown in FIG. 6, another embodiment of an identity authentication method according to an embodiment of this application includes the following steps.

501: A first terminal receives an authentication request sent by a second terminal.

502: The first terminal determines whether a first version number is less than or equal to a second version number, and if yes, perform step 503; or if no, perform step 505.

503: When the first version number is less than or equal to the second version number, the first terminal determines whether a device list includes recorded information of the second terminal.

In an actual application, some terminal devices are not within network coverage because of an area or for another reason. Therefore, although a server updates a certificate and a version number, the devices cannot update them in time for a network reason. In this case, because the first terminal stores the device list sent by the server, and the device list includes identifiers and public keys of all terminals not removed from a trusted group, the first terminal may perform searching based on an identifier of the second terminal, to determine whether the device list stored by the first terminal also includes a record of the identifier of the second terminal, to determine whether the second terminal is already removed.

504: When the device list does not include the recorded information of the second terminal, the first terminal determines that an identity of the second terminal becomes invalid.

If the device list does not include the recorded information of the second terminal, that is, does not include the identifier and a public key of the second terminal, it indicates that the second terminal is a terminal device removed from or added to the trusted group, and therefore it is determined that the identity of the second terminal becomes invalid.

Optionally, when the first terminal determines that the device list includes the recorded information of the second terminal, this embodiment of this application may further include: obtaining, by the first terminal, the public key of the second terminal from the device list, and performing communication authentication with the second terminal by using the public key of the second terminal.

When the device list includes the recorded information of the second terminal, it indicates that the identity of the second terminal has been authenticated, and subsequent communication authentication can be performed. In this case, the second terminal does not need to send the public key of the second terminal to the first terminal, and the first terminal may directly obtain the public key of the second terminal from the device list to perform communication authentication. Communication authentication is a process in which when determining that the second terminal is not removed from the trusted group by the server, or determining that a certificate of the second terminal is generated by the server, the first terminal encrypts a data packet by using the public key of the second terminal, and sends the encrypted data packet to the second terminal, and the second terminal parses the data packet and performs authentication.

505: When the first version number is greater than the second version number, the first terminal receives a second certificate and a public key that are sent by the second terminal.

When the version number of the second terminal is greater than that of the first terminal, the first terminal needs to obtain the public key of the second terminal, and in a subsequent communication authentication process, perform communication encryption authentication by using the public key.

In this case, the first terminal may not update the device list, and the second terminal is a latest terminal device added to the trusted group. Therefore, the first terminal does not need to search the device list to determine whether the device list includes the recorded information of the second terminal, and the second terminal is required to send the public key of the second terminal to the first terminal.

506: The first terminal checks, based on a public key of a server, whether the second certificate is a certificate sent by the server to the second terminal.

The public key of the server may be obtained by the first terminal in advance. For example, after generating a public-private key pair, the server broadcasts the public key to all terminal devices, or when sending the certificate and the version number to the terminal, the server may also send the public key of the server to the terminal.

To avoid that the certificate sent by the second terminal to the first terminal is a fake certificate, that is, is not the certificate sent by the server, the first terminal needs to check the certificate. Only when the second certificate is a signature certificate generated by the server by using a private key of the server, authentication is correct.

507: When determining that the second certificate is not the certificate sent by the server to the second terminal, the first terminal determines that an identity of the second terminal becomes invalid.

When the first terminal verifies that the second certificate is not the certificate sent by the server to the second terminal, it indicates that the certificate sent by the second terminal to the first terminal is not the certificate sent by the server to the second terminal. Therefore, the first terminal may determine that the identity of the second terminal is insecure or becomes invalid, and a subsequent communication authentication process does not need to be performed.

Optionally, when the first terminal authenticates that the second certificate of the second terminal is correct, in a subsequent communication authentication process, the first terminal receives the public key of the second terminal that is sent by the second terminal, and performs communication authentication with the second terminal by using the public key of the second terminal.

Figure 7:
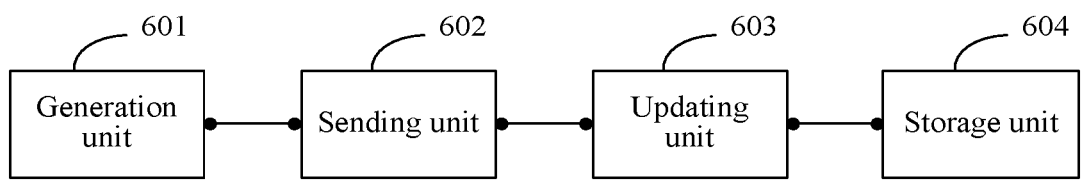
FIG. 7 is a schematic diagram of an embodiment of a server according to an embodiment of this application.

As shown in FIG. 7, an embodiment of a server according to an embodiment of this application includes: a generation unit 601, configured to: when a group joining request that is sent by a first terminal and that is used for joining a trusted group is received, generate a first certificate for the first terminal based on a first version number; a sending unit 602, configured to send the first certificate and the first version number to the first terminal; and an updating unit 603, configured to: when it is determined that a second terminal is removed from the trusted group, update, by the server, the first version number to a second version number according to a preset rule, where the generation unit 601 is further configured to separately generate, based on the second version number, a corresponding second certificate for a terminal not removed from the trusted group; and the sending unit 602 is further configured to separately send the corresponding second certificate and the second version number to the terminal not removed from the trusted group.

Optionally, the group joining request includes an identifier and a public key of the first terminal; and the server further includes: a storage unit 604, configured to store the identifier and the public key of the first terminal to a device list; and the sending unit 602 is further configured to send the device list to the first terminal, where the device list includes identifiers and public keys of all terminals not removed from the trusted group, so that the first terminal obtains, from the device list in an authentication process, a public key of a to-be-authenticated terminal to perform authentication processing.

Optionally, the sending unit 602 is further configured to: send, to all the terminals not removed from the trusted group, the device list storing the identifier and the public key of the newly added first terminal.

For detailed descriptions of the embodiment of FIG. 7, refer to the described content of the identity authentication method in the embodiments of FIG. 2 to FIG. 4, and details are not described herein again.

Figure 8:
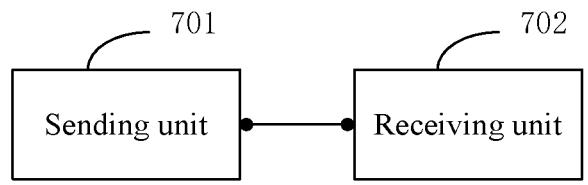
FIG. 8 is a schematic diagram of an embodiment of a terminal according to an embodiment of this application.

Referring to FIG. 8, in an embodiment of FIG. 8, a terminal is a first terminal according to an embodiment of this application, and includes: a sending unit 701, configured to send a group joining request for joining a trusted group to a server, where the group joining request includes an identifier and a public key of the first terminal; and a receiving unit 702, configured to receive a first certificate and a first version number that are sent by the server, where the first certificate is a certificate generated by the server for the first terminal based on the first version number, where the receiving unit 702 is further configured to: when a second terminal is removed from the trusted group, receive a second certificate and a second version number that are sent by the server, where the second version number is a version number updated by the server according to a preset rule, and the second certificate is a certificate generated by the server for the first terminal based on the second version number.

Optionally, the receiving unit 702 is further configured to: receive a device list sent by the server, where the device list includes identifiers and public keys of all terminals not removed from the trusted group, so that the first terminal obtains, from the device list in an authentication process, a public key of a to-be-authenticated terminal to perform authentication processing.

For detailed descriptions of the embodiment of FIG. 8, refer to the described content of the identity authentication method in the embodiments of FIG. 2 to FIG. 4, and details are not described herein again.

Figure 9:
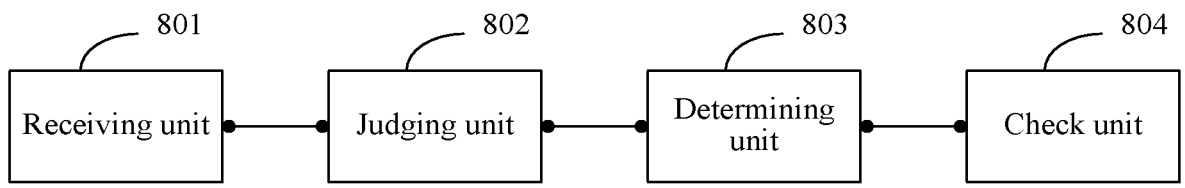
FIG. 9 is a schematic diagram of another embodiment of a terminal according to an embodiment of this application.

As shown in FIG. 9, another embodiment of a terminal according to an embodiment of this application includes: a receiving unit 801, configured to receive an authentication request sent by a second terminal, where the authentication request includes a first version number and an identifier of the second terminal, the first version number is a version number sent by a server to the terminal, and when a terminal is removed from a trusted group, the server accumulates a version number and sends an accumulated version number to all terminals not removed from the trusted group; a judging unit 802, configured to determine whether the first version number is less than a second version number, where the second version number is a version number sent by the server and stored by the first terminal; and a determining unit 803, configured to: when determining that the first version number is less than the second version number, determine, by the first terminal, that an identity of the second terminal becomes invalid.

Optionally, the first terminal stores a device list sent by the server, and the device list includes identifiers and public keys of all the terminals not removed from the trusted group; the judging unit 802 is further configured to: when determining that the first version number is less than or equal to the second version number, determine whether the device list includes recorded information of the second terminal; and the determining unit 803 is further configured to: when determining that the device list does not include the recorded information of the second terminal, determine that the identity of the second terminal becomes invalid.

Optionally, the first terminal stores a device list sent by the server, and the device list includes identifiers and public keys of all the terminals not removed from the trusted group; the receiving unit 801 is further configured to: when the first terminal determines that the first version number is greater than the second version number, receive a second certificate sent by the second terminal; the terminal further includes: a check unit 804, configured to check, based on a public key of the server, whether the second certificate is a certificate sent by the server to the second terminal; and the determining unit 803 is further configured to: when determining that the second certificate is not the certificate sent by the server to the second terminal, determine that the identity of the second terminal becomes invalid.

For detailed descriptions of the embodiment of FIG. 9, refer to the described content of the identity authentication method in the embodiments of FIG. 5 and FIG. 6, and details are not described herein again.

Figure 10:
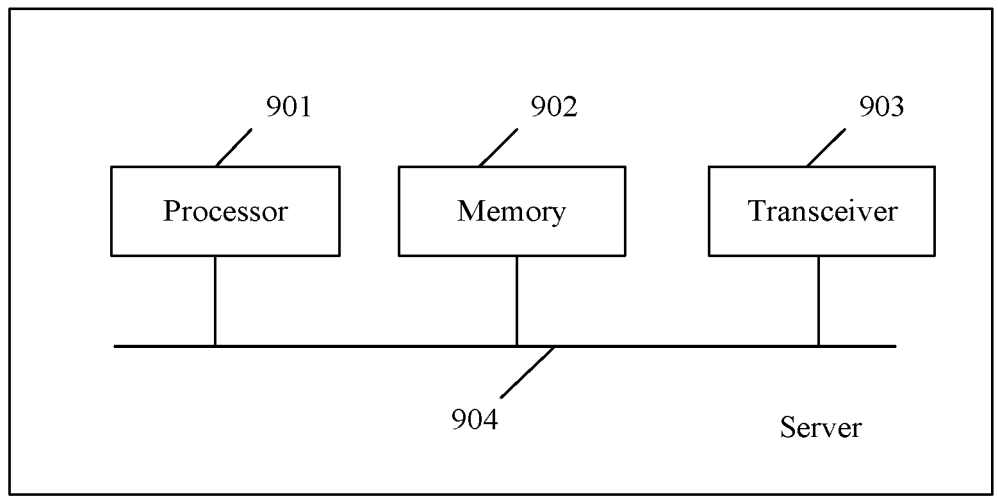
FIG. 10 is a schematic diagram of another embodiment of a server according to an embodiment of this application.

The server in the embodiment of FIG. 7 further includes an embodiment in another form. Referring to FIG. 10, the server includes: a processor 901, a memory 902, and a transceiver 903. The processor 901, the memory 902, and the transceiver 903 are connected by using a bus 904. The transceiver 903 may include a transmitter and a receiver. The memory 902 stores a computer instruction, and the processor 901 executes the computer instruction to perform the function performed by the server in the identity authentication methods in the embodiments of FIG. 2 to FIG. 4. Various flexible design manners may be used in a specific implementation. For corresponding functions of various components, further refer to the method embodiments, and this is not limited in this application.

Figure 11:
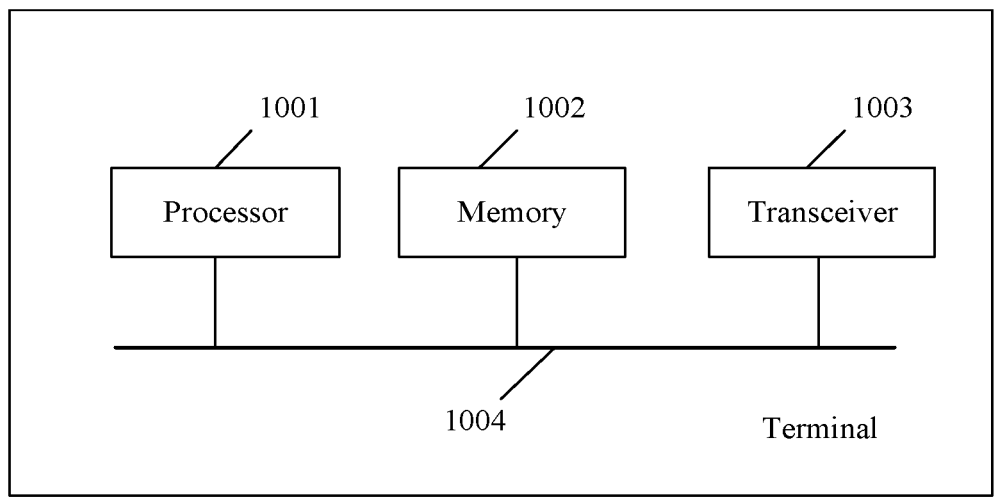
FIG. 11 is a schematic diagram of another embodiment of a terminal according to an embodiment of this application.

The terminal in the embodiments of FIG. 8 and FIG. 9 further includes an embodiment in another form. Referring to FIG. 11, the terminal includes: a processor 1001, a memory 1002, and a transceiver 1003. The processor 1001, the memory 1002, and the transceiver 1003 are connected by using a bus 1004. The transceiver 1003 may include a transmitter and a receiver. The memory 1002 stores a computer instruction, and the processor 1001 executes the computer instruction to perform the function performed by the terminal in the identity authentication methods in the embodiments of FIG. 2 to FIG. 6. Various flexible design manners may be used in a specific implementation. For corresponding functions of various components, further refer to the method embodiments, and this is not limited in this application.

Figure 12:
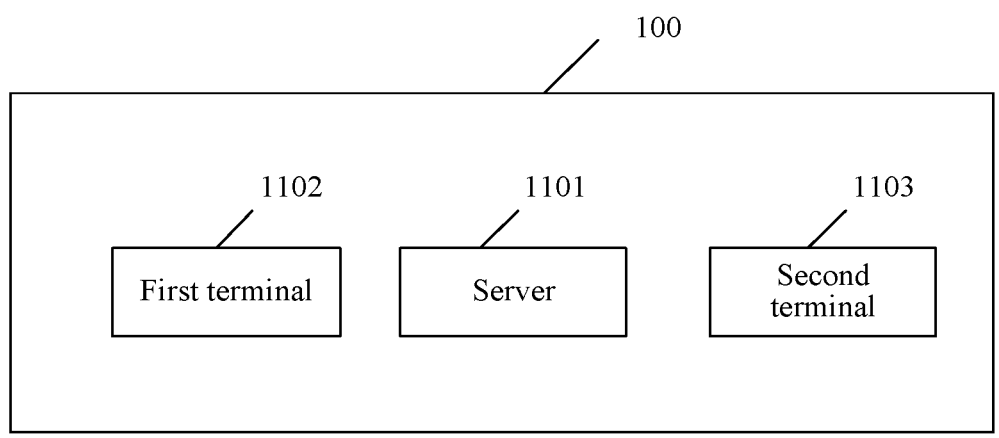
FIG. 12 is a schematic diagram of an embodiment of an identity authentication system according to an embodiment of this application.

Referring to FIG. 12, an embodiment of this application further provides an identity authentication system 100, including: a server 1101, a first terminal 1102, and a second terminal 1103, where the first terminal 1102 is configured to send, the server 1101, a group joining request for requesting to join a trusted group; the server 1101 is configured to generate a first certificate for the first terminal 1102 based on a first version number; the server 1101 is further configured to send the first certificate and the first version number to the first terminal 1102; the first terminal 1102 is further configured to receive the first certificate and the first version number that are sent by the server 1101; when the server 1101 determines that the second terminal 1103 is removed from the trusted group, the server 1101 is further configured to update the first version number to a second version number according to a preset rule; the server 1101 is further configured to separately generate, based on the second version number, a corresponding second certificate for a terminal not removed from the trusted group; the server 1101 is further configured to separately send the corresponding second certificate and the second version number to the terminal not removed from the trusted group; and the first terminal 1102 is further configured to receive the second certificate and the second version number that are sent by the server 1101.

Optionally, the group joining request includes an identifier and a public key of the first terminal; and the server 1101 is further configured to: store the identifier and the public key of the first terminal 1102 to a device list, and send the device list to the first terminal 1102, where the device list includes identifiers and public keys of all terminals not removed from the trusted group, so that the first terminal 1102 obtains, from the device list in an authentication process, a public key of a to-be-authenticated terminal to perform authentication processing.

The first terminal is further configured to receive the device list sent by the server 1101.

Optionally, the server 1101 is further configured to send, to all the terminals not removed from the trusted group, the device list storing the identifier and the public key of the newly added first terminal 1102.

All or some of the foregoing embodiments may be implemented by using software, hardware, firmware, or any combination thereof. When software is used to implement the embodiments, the embodiments may be all or partially implemented in a form of a computer program product.

The computer program product includes one or more computer instructions. When the computer program instructions are loaded and executed on a computer, the procedures or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (e.g., a coaxial cable, an optical fiber, or a digital subscriber line (DSL)) or wireless (e.g., infrared, radio, microwave, or the like) manner. The computer-readable storage medium may be any usable medium accessible by a computer, or a data storage device, such as a server or a data center, integrating one or more usable media. The usable medium may be a magnetic medium (e.g., a floppy disk, a hard disk, or a magnetic tape), an optical medium (e.g., a DVD), a semiconductor medium (e.g., a Solid State Disk, SSD), or the like.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a Read-Only Memory (ROM), a Random Access Memory (RAM,), a magnetic disk, or an optical disc.

What is claimed is:

1. An identity authentication method, carried out on a server and first terminal, the method comprising:
   receiving, by the server, a group joining request for joining a trusted group, wherein the group joining request was sent by the first terminal, and wherein in accordance with the receiving the group joining request the server performs further operations as follows:
   generating a first certificate for the first terminal based on a first version number that corresponds to the trusted group including at least the first terminal, a second terminal and a third terminal;
sending the first certificate and the first version number to the first terminal;
determining, after the generating a first certificate, that the second terminal is removed from the trusted group; and
performing, in accordance with the determining that the second terminal is removed from the trusted group, further operations including:
updating the first version number to a second version number according to a preset rule, wherein the second version number corresponds to the trusted group that includes the first terminal and the third terminal, and the second version number is greater than the first version number;
generating, based on the second version number for each terminal that is not removed from the trusted group, a corresponding second certificate; and
sending the corresponding second certificate and the second version number to each terminal that is not removed from the trusted group, including the first terminal of the trusted group;
wherein the first terminal stores a device list sent by the server,
wherein the device list includes recorded information for each terminal that is not removed from the trusted group,
wherein the recorded information includes, for each terminal that is not removed from the trusted group, a corresponding:
identifier, and
public key;
wherein the method further comprises the first terminal performing further operations as follows:
receiving an authentication request sent by the third terminal, wherein the authentication includes a third version number and an identifier of the third terminal;
first determining the third version number is less than the second version number;
further determining, in accordance with the first determining, a match exists between:
the identifier of the third terminal in the authentication request, and
the identifier of the third terminal in recorded information for the third terminal in the device list; and
determining, in accordance with the further determining, an identity of the third terminal is valid.

2. The method according to claim 1, wherein the group joining request comprises an identifier and a public key of the first terminal; and the method further comprises:
storing the identifier and the public key of the first terminal to a device list; and
sending the device list to the first terminal,
wherein the device list comprises an identifier and a public key for each terminal that is not removed from the trusted group, thereby enabling the first terminal to obtain, from the device list in an authentication process, a public key of a to-be-authenticated terminal to perform authentication processing.

3. The method according to claim 2, wherein the method further comprises:
sending, to all the terminals not removed from the trusted group, the device list storing the identifier and the public key of the first terminal.

4. A system including a server and a first terminal,
wherein the server comprises a first processor; and a first memory comprising computer-executable instructions that, when executed by the first processor, facilitate the server carrying out a method comprising:
receiving a group joining request for joining a trusted group, wherein the group joining request was sent by the first terminal, and wherein in accordance with the receiving the group joining request the server performs further operations as follows:
generating a first certificate for the first terminal based on a first version number that corresponds to the trusted group including at least the first terminal, a second terminal and a third terminal;
sending the first certificate and the first version number to the first terminal;
determining, after the generating a first certificate, that the second terminal is removed from the trusted group, and
performing, in accordance with the determining that the second terminal is removed from the trusted group, further operations including:
updating the first version number to a second version number according to a preset rule, wherein the second version number corresponds to the trusted group that includes the first terminal and the third terminal, and the second version is greater than the first version;
generating, based on the second version number for each terminal that is not removed from the trusted group, a corresponding second certificate; and
sending the corresponding second certificate and the second version number to each terminal that is not removed from the trusted group, including the first terminal of the trusted group;
wherein the first terminal stores a device list sent by the server,
wherein the device list includes recorded information for each terminal that is not removed from the trusted group,
wherein the recorded information includes, for each terminal that is not removed from the trusted group, a corresponding:
identifier, and
public key;
wherein the method further comprises the first terminal performing further operations as follows:
receiving an authentication request sent by the third terminal, wherein the authentication includes a third version number and an identifier of the third terminal;
first determining the third version number is less than the second version number;
further determining, in accordance with the first determining, a match exists between:
the identifier of the third terminal in the authentication request, and
the identifier of the third terminal in recorded information for the third terminal in the device list; and
determining, in accordance with the further determining, an identity of the third terminal is valid.

5. The system according to claim 4, wherein the group joining request comprises an identifier and a public key of the first terminal; and the server further comprises a storage, and wherein the method further comprises:
storing, in the storage, the identifier and the public key of the first terminal to a device list; and sending the device list to the first terminal,
wherein the device list comprises an identifier and a public key for each terminal that is not removed from the trusted group, thereby enabling the first terminal to obtain, from the device list in an authentication process, a public key of a to-be-authenticated terminal to perform authentication processing.

6. The system according to claim 5, wherein the method further comprises:
sending, to all the terminals not removed from the trusted group, the device list storing the identifier and the public key of the first terminal.

* * * * *